United States Patent
Schoenbeck et al.

[11] Patent Number: 6,029,508
[45] Date of Patent: Feb. 29, 2000

[54] REMOTE PORTABLE DISPLAY UNIT WITH WIRELESS TRANSCEIVER AND ENGINE ANALYZING SYSTEM INCORPORATING SAME

[75] Inventors: Michael D. Schoenbeck, Silver Lake; Mark A. Hoferitza, Kenosha, both of Wis.

[73] Assignee: Snap-on Technologies, Inc., Lincolnshire, Ill.

[21] Appl. No.: 08/621,785

[22] Filed: Mar. 25, 1996

[51] Int. Cl.7 .................................................. G01M 15/00
[52] U.S. Cl. .................................................. 73/116
[58] Field of Search .................................. 73/116, 117.2, 73/117.3, 118.1

[56] References Cited

U.S. PATENT DOCUMENTS

| | | |
|---|---|---|
| 3,583,217 | 6/1971 | Howes . |
| 3,815,410 | 6/1974 | Brown, Jr. et al. . |
| 4,125,894 | 11/1978 | Cashel et al. . |
| 4,270,174 | 5/1981 | Karlin et al. ............................. 73/116 |
| 4,602,127 | 7/1986 | Neely et al. . |
| 4,628,478 | 12/1986 | Henderson, Jr. . |
| 4,671,111 | 6/1987 | Lemelson . |
| 4,738,133 | 4/1988 | Breckel et al. . |
| 4,739,253 | 4/1988 | Everhart et al. . |
| 4,757,463 | 7/1988 | Ballou et al. .......................... 73/117.2 |
| 4,787,053 | 11/1988 | Moore ................................... 73/117.4 |
| 4,922,443 | 5/1990 | Coetsier et al. ........................ 73/117.2 |
| 4,992,775 | 2/1991 | Castle et al. . |
| 5,034,889 | 7/1991 | Abe . |
| 5,157,759 | 10/1992 | Bachenko . |
| 5,227,766 | 7/1993 | Endo . |
| 5,250,935 | 10/1993 | Jonker et al. . |
| 5,257,190 | 10/1993 | Crane ..................................... 73/117.2 |
| 5,272,769 | 12/1993 | Strnatka et al. . |
| 5,309,351 | 5/1994 | McCain et al. . |
| 5,318,449 | 6/1994 | Schoell et al. ......................... 73/117.2 |
| 5,379,409 | 1/1995 | Ishikawa . |
| 5,396,422 | 3/1995 | Forchert et al. . |
| 5,442,553 | 8/1995 | Parrillo . |
| 5,450,321 | 9/1995 | Crane ..................................... 73/117.2 |
| 5,646,340 | 7/1997 | Gee et al. ................................. 73/116 |
| 5,657,233 | 8/1997 | Cherrington et al. ................. 73/117.2 |
| 5,684,251 | 11/1997 | Arcas et al. .............................. 73/588 |
| 5,717,595 | 2/1998 | Cherrington et al. ................. 73/117.2 |

OTHER PUBLICATIONS

Snap–on Incorporated 1996 Catalog, pp. E4 and E6, respectively disclosing MT3000 Digital Engine Analyzer and MT3000–600 Remote Control Unit.

*Primary Examiner*—Eric S. McCall
*Attorney, Agent, or Firm*—Emrich & Dithmar

[57] ABSTRACT

An engine analyzing system includes an engine analyzer unit having a CRT display screen for displaying display data based on parameter data received from an associated engine. The system also includes a remote portable display unit with a second CRT display screen and a display control keypad. Each of the analyzer unit and the remote display unit has a wireless transmitter and a wireless receiver. The data displayed on the analyzer display screen is transmitted to the remote unit for display on its screen. By use of the keypad display control signals are transmitted from the remote unit to the analyzer unit for controlling the analyzer unit display and, thereby, the remote unit display.

13 Claims, 1 Drawing Sheet

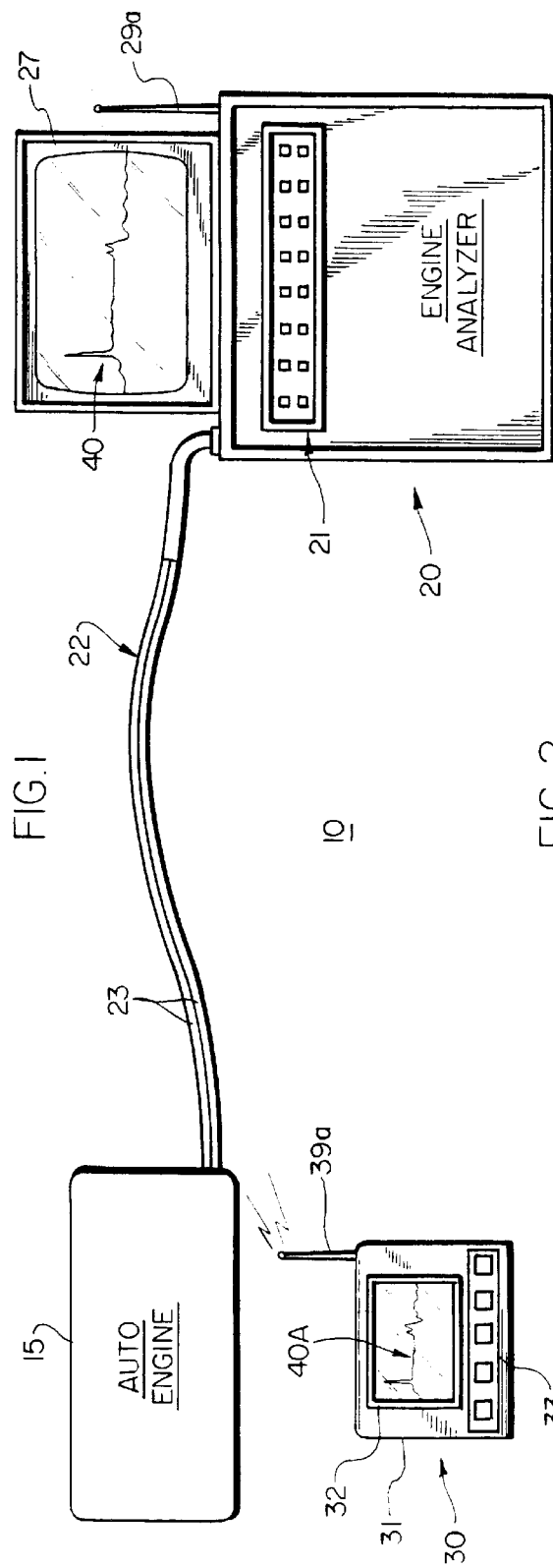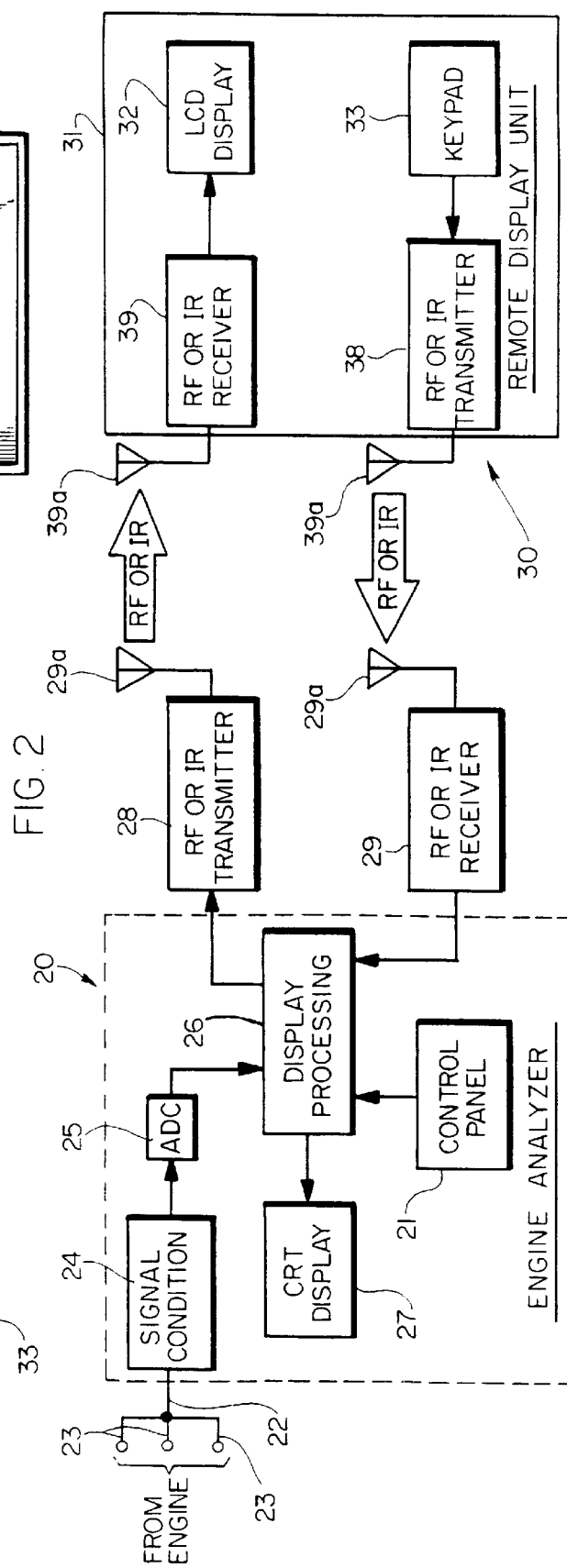

REMOTE PORTABLE DISPLAY UNIT WITH WIRELESS TRANSCEIVER AND ENGINE ANALYZING SYSTEM INCORPORATING SAME

BACKGROUND OF THE INVENTION

1. Field of the Invention

This invention relates to methods and apparatus for electronically diagnosing and analyzing the performance of machines, such as internal combustion engines, The invention relates particularly to digital engine analyzers of the type which display digitized information on an oscilloscope screen.

2. Description of the Prior Art

The present invention is an improvement of the digital engine analyzer disclosed in U.S. Pat. No. 5,250,935, the disclosure of which is incorporated herein by reference. That analyzer includes a set of probes for coupling to an associated automotive engine under analysis and for receiving input signals therefrom. The analyzer processes these signals, digitizes them and stores them for further processing and/or display. The system also is responsive to the input signals for generating display data for display on a CRT display screen.

The system disclosed in U.S. Pat. No. 5,250,935 is sold by Snap-on Incorporated under the designation MT-3000. That system is available with a remote control unit, much like a television remote control, by which an operator can operate the front panel controls of the engine analyzer from a remote location up to 20 feet away. However, this requires that the operator be in the line of sight to the analyzer display screen so that he can see the screen and must be close enough so that he can discern what is being displayed, so as to determine which control functions need to be exercised and to be able to confirm their execution.

It is known to transmit display data from a central processing unit to a remote display unit by wire transmission over telephone lines, such a system being disclosed, for example, in U.S. Pat. No. 4,739,253. However, such wireline systems are not suitable for use in automotive service or repair facility environments. It is also known to utilize portable computer terminals in wire or wireless communication with other terminals in a network system, but such portable terminals operate substantially like any other computer terminal, having substantial processing power, and being quite expensive.

SUMMARY OF THE INVENTION

It is a general object of this invention to provide an improved machine diagnosis and analysis system which avoids the disadvantages of prior systems while affording additional structural and operating advantages.

An important feature of the invention is the provision of a system which provides for a remote display capability.

In connection with the foregoing feature, a further feature of the invention is the provision of a system of the type set forth, which provides for wireless communication between a remote display unit and a central processing unit.

A further feature of the invention is the provision of a portable remote display unit for use in a system of the type set forth.

Certain ones of these and other features of the invention are attained by providing a system for analyzing operating parameter data from a machine comprising: an analyzing unit including a first display screen, at least one probe for connecting the analyzing unit to an associated machine for receiving operating parameter data from the machine, the analyzing unit including display processing means coupled to the first display screen and to the at least one probe and responsive to the parameter data for generating display data and causing the display data to be displayed on the first display screen, and a wireless transmitter coupled to the display processing means for wireless transmission of the display data displayed on the first display screen; and a remote portable display apparatus having a second display screen, and a wireless receiver coupled to the second display screen to receive the display data transmitted by the transmitter for display thereof on the second display screen.

Other features of the invention are attained by providing a remote portable display apparatus comprising: a housing, a display screen disposed in the housing, a wireless receiver disposed in the housing and coupled to the display screen for display of received data on the display screen, a control unit disposed in the housing for generating control signals, and a wireless transmitter disposed in the housing and coupled to the control unit for transmitting the control signals.

The invention consists of certain novel features and a combination of parts hereinafter fully described, illustrated in the accompanying drawings, and particularly pointed out in the appended claims, it being understood that various changes in the details may be made without departing from the spirit, or sacrificing any of the advantages of the present invention.

BRIEF DESCRIPTION OF THE DRAWINGS

For the purpose of facilitating an understanding of the invention, there is illustrated in the accompanying drawings a preferred embodiment thereof, from an inspection of which, when considered in connection with the following description, the invention, its construction and operation, and many of its advantages should be readily understood and appreciated.

FIG. 1 is a partially block and partially schematic diagram of an engine analysis system in accordance with the present invention, shown coupled to an associated automotive engine; and FIG. 2 is a functional block diagram of the system of the present invention.

DESCRIPTION OF THE PREFERRED EMBODIMENT

Referring to FIGS. 1 and 2 of the drawings, there is illustrated an analysis system generally designated by the numeral 10, in accordance with the present invention, for performing diagnostic tests on an associated machine, such as an automotive internal combustion engine 15. The analysis system 10 includes an engine analyzing unit 20 and a remote display unit 30. The engine analyzing unit 20 may be a digital engine analyzer of the type disclosed in the aforementioned U.S. Pat. No. 5,250,935, the disclosure of which is incorporated herein by reference. Thus, only so much of the engine analyzing unit 20 as is necessary for an understanding of the present invention will be described herein in detail. However, while the engine analyzing unit 20 is described as being of the type disclosed in U.S. Pat. No. 5,250,935, it will be appreciated that the present invention is usable with other types of engine analyzers.

The engine analyzing unit 20 is a digital engine analyzer provided with a suitable control panel 21 and a lead set 22 incorporating a plurality of probes 23 adapted for coupling to selected points in the associated engine 15 under analysis. The probes 23 are coupled internally of the analyzing unit 20 to signal conditioning circuitry 24 which is, in turn, coupled to an analog-to-digital converter 25 for digitizing the operating parameter data received from the engine 15. The digitized data is supplied to display processing circuitry 26, which includes one or more microprocessors operating under stored program control and is responsive to the digitized parameter data for generating display data which is, in turn, supplied to a CRT display 27 for display. Preferably, the display 27 is in the form of a digital oscilloscope. A control panel 21 is also coupled to the display processing circuitry 26 for controlling the operation of the analyzing unit 20 and, in particular, for controlling the display data. The control panel 21 may include a keyboard or keypad, and soft keys associated with the CRT display 27, all as is described in greater detail in the aforementioned U.S. Pat. No. 5,250,935.

In accordance with the present invention, the display processing circuitry 26 of the analyzing unit 20 is coupled to a wireless transmitter 28 and a wireless receiver 29 which are, in turn, coupled to a suitable antenna or other transmission coupler 29a. While two separate antenna symbols are illustrated in FIG. 2, it will be appreciated that the transmitter and receiver 28 and 29 may be coupled to a common antenna. The transmitter and receiver 28 and 29 may be any of a number of well-known radio frequency (RF) or infrared (IR) devices. It will be appreciated that the transmitter 28 includes a suitable modulator for modulating data to be transmitted onto a suitable carrier signal, and the receiver similarly includes a demodulator for extracting the received data from the carrier signal, all in a well-known manner. Thus, in the present invention, the display processing circuitry 26 may receive control signals from a remote site via the receiver 29 and may transmit to the remote site via the transmitter 28 the same display data which is displayed on the CRT display 27. While, in FIG. 2, the functional blocks for the transmitter and receiver 28 and 29 are shown externally of the analyzing unit 20, it will be appreciated that they are preferably disposed in a common housing.

The remote display unit 30 includes a portable, hand-held housing 31 which houses a display 32, which is preferably an LCD display screen, and a control unit which may be in the nature of a keypad 33. The display unit 30 also includes a wireless transmitter 38 and a wireless receiver 39 coupled to a suitable antenna or other transmission medium coupler 39a. While, in FIG. 2, separate antenna symbols are illustrated for the transmitter and receiver 38 and 39, it will be appreciated that they may be coupled to a common transmitter, as indicated in FIG. 1. The transmitter and receiver 38 and 39 may be either RF or IR devices but they are, respectively, of the same type as the transmitter and receiver 28 and 29. It will also be appreciated that the remote display unit 30 is provided with a suitable battery-powered power supply (not shown).

The control unit 33 and the transmitter 38, may, in combination, be in the form of a remote control unit of the type sold by Snap-on Incorporated under the designation MT-3000-600, which is a wireless remote control unit designed specifically for use with an engine analyzer unit of the type disclosed in U.S. Pat. No. 5,250,935, for effecting remote control of control functions which are executable from the control panel 21 of the analyzing unit 20. The only difference is that, in the present invention, the remote control unit comprising the keypad 33 and the transmitter 38 is incorporated into the common housing 31 with the display 32 and receiver 39. However, it will be appreciated that other types of control units could also be utilized.

In operation, the engine analyzing unit 20 may display on its CRT display 27 display data which may, for example, be in the nature of a waveform 40. That same display data is transmitted by the transmitter 28 to the remote display unit 30, where it is received by the receiver 39 for display on the LCD display 32 as waveform 40A, which is identical to the waveform 40 (with the exception of size, depending upon the relative sizes of the display screens). Thus, whatever is displayed on the analyzing unit display 27 will also be displayed on the remote display 32. Accordingly, an operator, carrying the remote display unit 30, can move freely about the vehicle under examination and perform various test functions while at the same time being able to observe the display data without the need to remain close, to or in the line of sight of, the display 27 of the engine analyzing unit 20. If the operator wishes to change the nature of the display, he can do so by operating the keypad 33 which generates control signals which are, in turn, transmitted by the transmitter 38 to the engine analyzing unit 20, where they are received by the receiver 29 and applied to the display processing circuitry 26, in just the same manner as if they had been generated from the control panel 21 of the engine analyzing unit 20. Whatever changes are thereby effected in the display 27 of the analyzing unit will also simultaneously be effected at the remote display 32 through the transmitter 28 and the receiver 39. It is only necessary that the remote control unit 33 incorporate a few simple controls, such as a freeze key and waveform resizing or repositioning keys. However, if desired, the remote control unit or keypad 33 could be arranged so as to be able to remotely execute any of the control functions which could be executed from the control panel 21 of the analyzing unit 20. Thus, different tests could be initiated and different program menu screens could be displayed, and the like.

It is a significant aspect of the invention that the remote display unit 30 is of very simple and economical construction. Thus, no onboard processing circuitry is necessary, which greatly simplifies and reduces the cost of the remote display unit 30.

From the foregoing, it can be seen that there has been provided an improved remote display unit adapted for use in conjunction with a main analyzing unit which is provided with its own display, so that a user can view and control the display data at a location from the main analyzing unit.

While a particular embodiment of the present invention has been shown and described, it will be obvious to those skilled in the art that changes and modifications may be made without departing from the invention in its broader aspects. Therefore, the aim in the appended claims is to cover all such changes and modifications as fall within the true spirit and scope of the invention. The matter set forth in the foregoing description and accompanying drawings is offered by way of illustration only and not as a limitation. The actual scope of the invention is intended to be defined in the following claims when viewed in their proper perspective based on the prior art.

We claim:

1. A system for analyzing operating parameter data from a machine comprising: an analyzing unit including a first display screen, at least one probe for connecting said analyzing unit to an associated machine for receiving operating parameter data from the machine, said analyzing unit including display processing means coupled to said first display screen and to said at least one probe and responsive to the parameter data for generating display data and causing said display data to be displayed on said first display screen, and a wireless transmitter coupled to said display processing means for wireless transmission of the display data displayed on said first display screen; and a remote portable hand-held unit having no on-board diagnostic processing and including a housing of a size to be easily held in a user's hand and carried about the machine, display apparatus disposed in the housing and having a second display screen, and a wireless receiver disposed in the housing and coupled to said second display screen to receive the display data transmitted by said transmitter for display thereof on said second display screen so that the display on the second display screen is the same as that on the first display screen.

2. The system of claim 1, wherein said first display screen is a cathode ray tube display.

3. The system of claim 1, wherein said second display screen is a liquid crystal display.

4. The system of claim 1, wherein said remote display apparatus is hand-held.

5. The system of claim 1, wherein said analyzing unit is an automotive engine analyzer for analyzing internal combustion engines.

6. The system of claim 1, wherein said transmitter and said receiver are radio frequency devices.

7. The system of claim 1, wherein said transmitter and said receiver are infrared devices.

8. A system for analyzing operating parameter data from a machine comprising: an analyzing unit including a first display screen, at least one probe for connecting said analyzing unit to an associated machine for receiving operating parameter data from the machine, said analyzing unit including display processing means coupled to said first display screen and to said at least one probe and responsive to the parameter data for generating display data and causing said display data to be displayed on said first display screen, a first wireless transmitter coupled to said display processing means for wireless transmission of the display data displayed on said first display screen, and a first wireless receiver coupled to said display processing means; and a remote portable hand-held unit having no on-board diagnostic processing and including a housing of a size to be easily held in a user's hand and carried about the machine, display apparatus disposed in the housing and having a second display screen, a second wireless receiver disposed in the housing and coupled to said second display screen to receive the display data transmitted by said first transmitter for display thereof on said second display screen so that the display on the second display screen is the same as that on the first display screen, a remote control unit for generating display control signals, and a second wireless transmitter coupled to said remote control unit for transmitting the display control signals to said first wireless receiver for controlling said first display screen.

9. The system of claim 8, wherein said remote control unit includes a keypad.

10. The system of claim 8, wherein said remote portable display apparatus includes a common housing in which said second display screen and said remote control unit and said second wireless transmitter and receiver are disposed.

11. The system of claim 8, wherein said analyzing unit is an automotive engine analyzer for analyzing internal combustion engines.

12. The system of claim 8, wherein said transmitter and said receiver are radio frequency devices.

13. The system of claim 8, wherein said transmitter and said receiver are infrared devices.

* * * * *